United States Patent [19]
Robinson

[11] Patent Number: 5,785,334
[45] Date of Patent: Jul. 28, 1998

[54] BICYCLE TOWABLE COLLAPSIBLE CART

[76] Inventor: Russell S. Robinson, 3330 Webster Pl., Tucson, Ariz. 85715

[21] Appl. No.: 562,201

[22] Filed: Nov. 22, 1995

[51] Int. Cl.$^6$ ................................................ B62K 27/00
[52] U.S. Cl. ........................ 280/204; 280/42; 280/652; 280/656
[58] Field of Search ........................ 280/202, 204, 280/400, 503, 639, 644, 645, 646, 42, 647, 651, 652, 656, 650, 40, 292

[56] References Cited

U.S. PATENT DOCUMENTS

| | | |
|---|---|---|
| 3,367,676 | 2/1968 | Pearson et al. ................ 280/654 |
| 3,792,875 | 2/1974 | Paden ............................ 280/204 |
| 4,116,465 | 9/1978 | Maclaren ....................... 280/647 |
| 4,138,139 | 2/1979 | Alfonso ......................... 280/652 |
| 5,123,670 | 6/1992 | Chen .............................. 280/650 |

FOREIGN PATENT DOCUMENTS

| | | | |
|---|---|---|---|
| 0 544 361 | 6/1993 | European Pat. Off. ........ 280/656 |
| 2 092 078 | 8/1982 | United Kingdom ............ 280/656 |

*Primary Examiner*—Victor E. Johnson
*Assistant Examiner*—Gary Savitt
*Attorney, Agent, or Firm*—Kajane McManus

[57] ABSTRACT

A bicycle towable collapsible cart comprises a framework engageable to a rear bike wheel hub and expandable to stretch a fabric basket into container form. The framework engages removable wheels and, when the cart is in its collapsed state, a small package for storage or transport is formed.

3 Claims, 2 Drawing Sheets

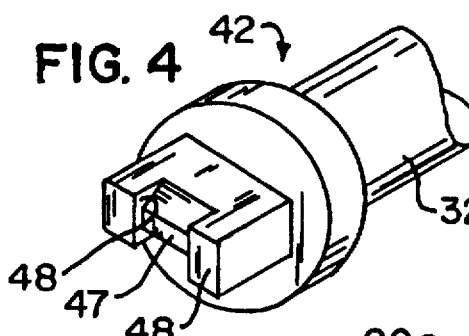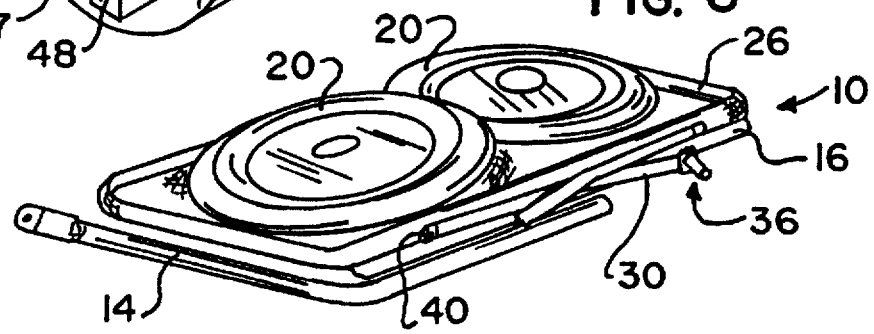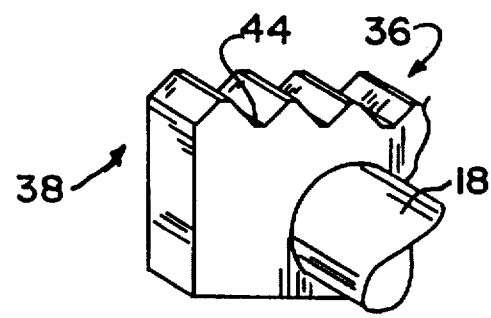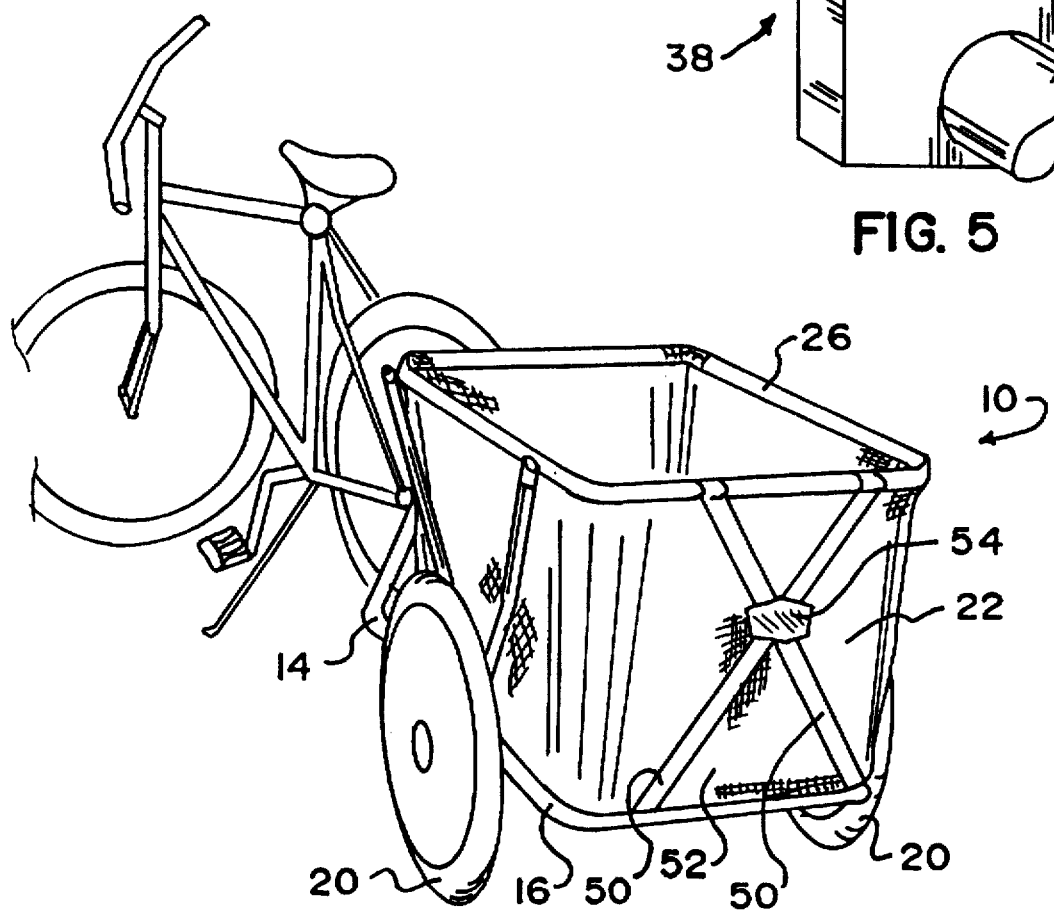

BICYCLE TOWABLE COLLAPSIBLE CART

BACKGROUND OF THE INVENTION

1. Field of the Invention

The present invention relates to a cart which is towable behind a bicycle and which is collapsible for storage. More specifically, the cart includes adjustable and removable struts for creating/collapsing the cart.

2. Prior Art

Heretofore, collapsible carts have been proposed. Examples may be found in the following U.S. Pat. Nos.:

| U.S. Pat. No. | Patentee |
| --- | --- |
| 1,128,333 | S. Krna |
| 3,229,990 | R. Weiner |
| 3,367,676 | R. D. Pearson et al |
| 4,398,736 | De Wijn |

As will be described in greater detail hereinafter, a collapsible cart having removable struts which can be adjusted relative to one another to provide a desired conformation to the cart, has not been proposed.

SUMMARY OF THE INVENTION

According to the invention there is provided a bike towable collapsible cart comprising a wheeled framework which is engageable to a rear wheel hub of a bike, said framework supporting a fabric basket which is upwardly extendable from the framework to form a transportable container.

BRIEF DESCRIPTION OF THE DRAWINGS

FIG. 4 is an enlarged view of the strut engaging end of a first strut of the cart.

FIG. 5 is an enlarged view of the strut engaging end of the cooperating second strut.

FIG. 6 is a perspective view showing the cart in its collapsed condition.

FIG. 7 is a perspective view showing the cart in tow behind a bicycle.

DESCRIPTION OF THE PREFERRED EMBODIMENT

Figure 1:
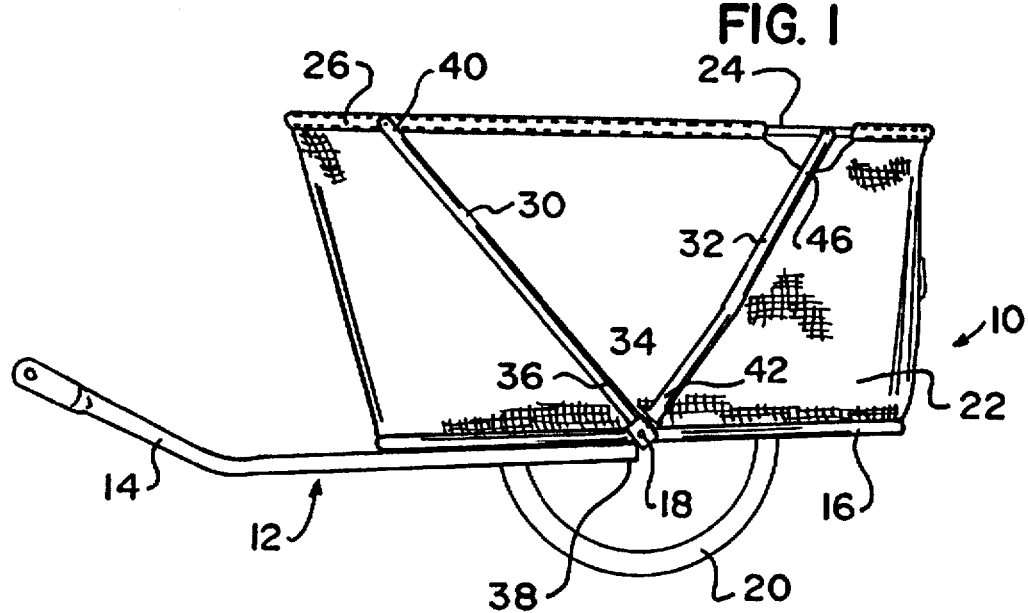
FIG. 1 is a side view of the cart of the present invention having one wheel removed therefrom to show engagement between vertical struts used in creating the cart.
Figure 2:
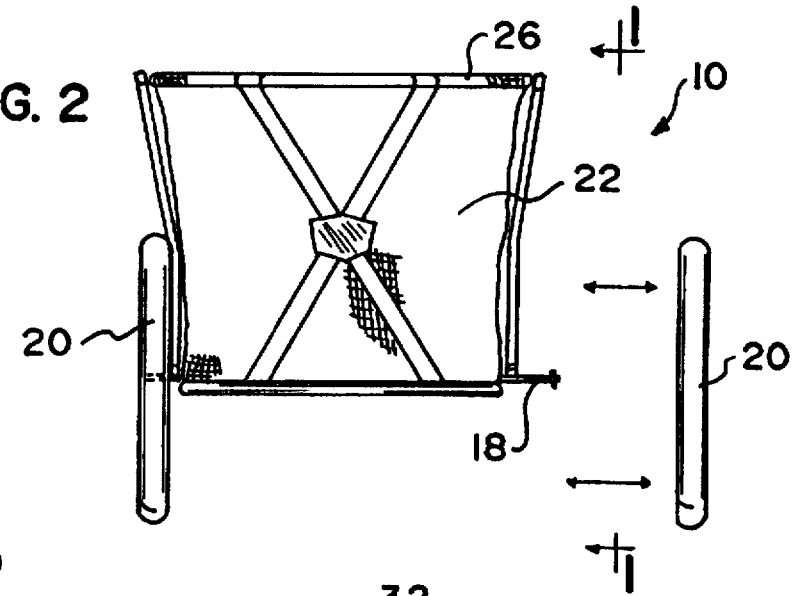
FIG. 2 is a rear view of the cart showing the wheel as being removable.
Figure 3:
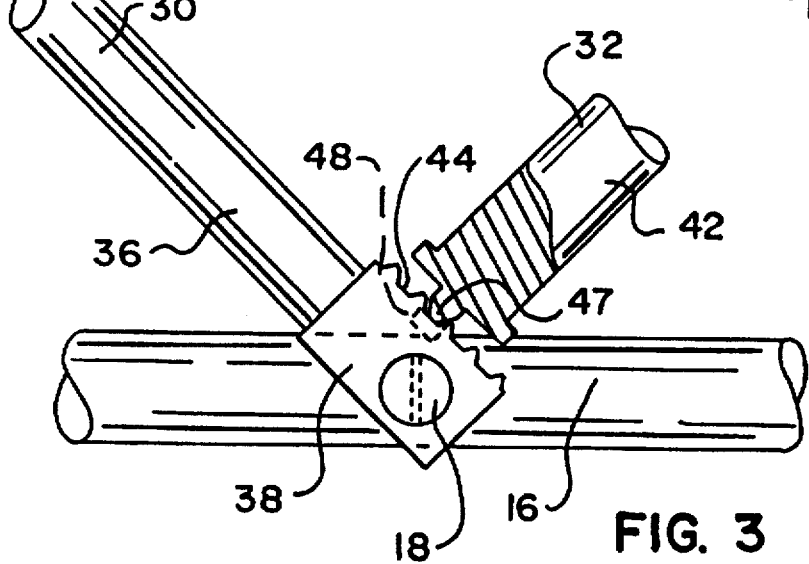
FIG. 3 is an enlarged perspective view of the area of juncture between two struts on one side of the cart.

Referring now to the drawings in greater detail, there is illustrated therein the bicycle towable collapsible cart made in accordance with the teachings of the present invention and generally identified by the reference numeral 10.

The cart 10 comprises a frame 12 which includes a bicycle-wheel-hub engaging tongue 14 extending forwardly from a bottom frame member 16 which defines the bottom periphery of the cart 10. The bottom frame member 16 has an axle 18 engaged thereto, about which each of two wheels 20 of the cart 10 revolve, one wheel 20 to each side of the cart 10. Extending upwardly a predetermined distance from the bottom frame member 16 is a fabric basket 22 which has a rim forming member 24 encased within a sleeve 26 formed about the open periphery of the fabric basket 22.

The rim forming member 24 of the basket 22 is elevated above the bottom frame member 16 by a pair of cooperating struts 30, 32 provided along each side 34 of the fabric basket 22.

A first strut 30 of each pair has a first end 36 which engages about the axle 18 and has a stepped connector 38 thereon with a second end 40 of the strut 30 being pivotably engaged to the rim forming member 24 of the basket 22 at a position lateral of the axle 18 when the cart 10 is viewed from the side 34.

A second strut 32 of each pair has a first end 42 which is adapted to engage upon a flat 44 of the stepped connector 38 with a second end 46 of the strut 32 being pivotably engaged to the rim forming member 24 of the basket 22 at a position lateral to the axle 18, in a direction opposite that of the first strut 30, so that, when cooperating ends 36 and 42 of the struts 30 and 32 are engaged to one another, the strut pair produces a vertical support for the basket 22 via the rim forming member 24 which is essentially "V" shaped, the point of the "V" forming at the axle 18. The struts 30, 32 of each pair may be bowed slightly away from one another, if desired.

The first end 42 of the second strut 32 includes a ramped pin member 47 which is edged by opposed shoulders 48, the pin member 47 configured to rest upon the flat 44 of the stepped connector 38, with the shoulders 48 engaging against the sides of the connector 38 to keep the pin member 47 from slipping out of the connector 38.

As stated above, the cart 10 is collapsible. The collapsed state is shown in FIG. 6. As illustrated, the removable wheels 20 are removed and the struts 30, 32 of each strut pair are disengaged from one another and pivoted to lie alongside the rim forming member 24. As the struts 30, 32 are disengaged, the basket 22 collapse onto the bottom frame member 16 and the wheels 20 can then be laid on top of the collapsed cart 10, providing a smaller package for storage or transport.

It is proposed to provide two strips of reflective tape 50 on a back surface 52 of the basket 22, preferably in the form of an X, and further to mount a reflector 54 on the back surface 52 at a point where the strips of tape 50 cross.

As described above, the cart 10 of the present invention provides a number of advantages, some of which have been described above and others of which are inherent in the invention. Also, modifications may be proposed to the cart 10 without departing from the teachings herein. Accordingly, the scope of the invention is only to be limited as necessitated by the accompanying claims.

I claim:

1. A bike towable collapsible cart comprising a wheeled framework which is engageable to a rear wheel hub of a bike, said framework supporting a fabric basket which is upwardly extendable from the framework to form a transportable container; said framework further engaging an axle extending side to side across said framework, said axle having opposite ends and wherein a wheel is removably engaged to each end of said axle; said fabric basket including an open top and wherein a top edge of the basket forms a sleeve within which a rim forming member is engaged; a pair of struts comprising a first strut and a second strut and being engaged between said framework and said rim member to elevate the top edge of the basket a predetermined distance above the framework; a first end of each of said struts being pivotably engaged to said rim forming member and a second end of said first strut being engaged about the axle and including a stepped connector thereon.

2. The cart of claim 1 wherein a second end of said second strut is configured to engage the stepped connector.

3. The cart of claim 2 wherein said framework further includes a tongue extending therefrom.

* * * * *